(12) United States Patent
Kiyohara et al.

(10) Patent No.: US 6,482,890 B2
(45) Date of Patent: Nov. 19, 2002

(54) AQUEOUS CURABLE RESIN COMPOSITION

(75) Inventors: Teruki Kiyohara, Osaka (JP); Shin'ichi Kuwamura, Kitakatsuragi-gun (JP)

(73) Assignee: Dainippon Ink and Chemical, Inc., Tokyo (JP)

( * ) Notice: Subject to any disclaimer, the term of this patent is extended or adjusted under 35 U.S.C. 154(b) by 0 days.

(21) Appl. No.: 09/892,894

(22) Filed: Jun. 28, 2001

(65) Prior Publication Data

US 2002/0045683 A1 Apr. 18, 2002

(30) Foreign Application Priority Data

Jun. 30, 2000 (JP) ........................................ 2000-198513

(51) Int. Cl.$^7$ ................................................. C08K 3/20
(52) U.S. Cl. .................... 524/806; 524/837; 524/838; 524/827; 524/831; 524/816; 524/819; 524/820; 525/100; 523/409; 523/410; 523/411
(58) Field of Search ............................ 525/100; 524/838, 524/837, 831, 827, 816, 819, 806, 820; 523/409, 410, 411

(56) References Cited

U.S. PATENT DOCUMENTS

| 4,146,585 | A | | 3/1979 | Ward et al. ................. 260/827 |
|---|---|---|---|---|
| 4,614,766 | A | | 9/1986 | Schimmel et al. ........... 525/104 |
| 5,380,781 | A | * | 1/1995 | Kato et al. .................. 523/404 |
| 5,530,063 | A | | 6/1996 | Nagai et al. ................. 525/101 |
| 5,861,194 | A | * | 1/1999 | Noguchi et al. ............. 427/386 |
| 5,985,980 | A | * | 11/1999 | Harui et al. ................. 524/506 |
| 6,103,788 | A | * | 8/2000 | Harui et al. ................. 523/403 |

FOREIGN PATENT DOCUMENTS

| DE | 195 29 659 A1 | 3/1996 |
|---|---|---|
| EP | 0195406 A2 | 9/1986 |
| EP | 0401496 A2 | 4/1990 |
| EP | 0806462 A1 | 11/1997 |
| EP | 0924250 A1 | 6/1999 |
| EP | 0949296 A1 | 10/1999 |
| WO | WO94/29390 | 12/1994 |

\* cited by examiner

Primary Examiner—Margaret G. Moore
(74) Attorney, Agent, or Firm—Armstrong Westerman & Hattori, LLP

(57) ABSTRACT

An object is to remarkably improve the water resistance and weather resistance of the cured coating film in the aqueous curable resin composition. An aqueous dispersion is used as a main agent which contains, as essential components, gel-like resin dispersed particles having a functional group selected from a salt of a tertiary amino group or a salt of an acid group and an aqueous medium, and a compound having both an epoxy group and a hydrolyzable silyl group is used as a curing agent.

12 Claims, No Drawings

AQUEOUS CURABLE RESIN COMPOSITION

BACKGROUND OF THE INVENTION

1. Field of the Invention

The present invention relates to a novel aqueous curable resin composition which is suited for use as an aqueous coating composition. More particularly, the present invention relates to an aqueous curable resin composition the cured article of which is superior in the water resistance and weather resistance, and which is also suited for use as an aqueous normal temperature-curable coating composition, the aqueous curable resin composition comprising an aqueous dispersion, as a main agent, containing gel-like resin dispersed particles having a functional group selected from a salt of a tertiary amino group or a salt of an acid group dispersed in an aqueous medium, and a compound having both an epoxy group and a hydrolyzable silyl group, as a curing agent.

2. Description of the Related Art

Based on the recent requirements such as protection of the environment and improvement of working environments on a global scale, it has become necessary to replace conventional coating compositions containing organic solvents with coating compositions from which organic solvent is less likely to volatilize into the atmosphere. Also, resins for coating compositions capable of curing at normal temperature are required in view of energy saving.

In view of the environment and energy savings, technologies using an aqueous emulsion composition as an organic solvent-free coating resin composition have been studied and put into practical use.

However, this aqueous emulsion composition has the fatal problem for a coating composition that the cured article has poor water resistance because emulsifiers or surfactants must be used. Therefore, its uses are limited. That is, at present, the performance of the coating film is still inferior to that of an organic solvent based coating composition.

As an organic solvent-free aqueous normal temperature-curable resin coating composition which neither contains an emulsifier nor a surfactant, for example, Japanese Patent Application, First Publication No. Hei 8-104846 discloses an aqueous normal temperature-curable resin composition wherein the water resistance and especially the weather resistance of the coating film is improved by using an aqueous compound, which is obtained by dispersing or dissolving a vinyl polymer having a tertiary amino group and/or an acid group neutralized with an acidic compound, or a vinyl polymer having an acid group and/or a tertiary amino group neutralized with a basic compound, in combination with a compound having both an epoxy group and a hydrolyzable silyl group.

However, the aqueous normal temperature-curable resin composition described in Japanese Patent Application, First Publication No. Hei 8-104846, as before, cannot attain satisfactory water resistance and weather resistance of the cured coating film and the performance of the coating film is inferior to an organic solvent based coating composition.

It is, therefore, an object of the present invention to remarkably improve the water resistance and weather resistance of the cured coating film in the aqueous curable resin composition.

SUMMARY OF THE INVENTION

The present inventors have carried out intensive studies in order to solve the problems described above and found that an excellent cured coating film, which is equivalent to that obtained with organic solvent based coating compositions can be obtained by using an aqueous dispersion as a main agent, which contains, as essential components, gel-like resin dispersed particles having a functional group selected from a salt of a tertiary amino group or a salt of an acid group and an aqueous medium, and using a compound having both an epoxy group and a hydrolyzable silyl group, as a curing agent. Thus, the present invention has been completed.

That is, the present invention relates to a two-pack aqueous curable resin composition comprising a combination of (I) an aqueous resin dispersion containing, as essential components, gel-like resin dispersed particles having a functional group selected from a salt of a tertiary amino group and a salt of an acid group, and an aqueous medium; and (II) a compound having both an epoxy group and a hydrolyzable silyl group.

DETAILED DESCRIPTION OF THE INVENTION

The gel-like resin dispersed particles used in the present invention have a functional group selected from a salt of a tertiary amino group and a salt of an acid group, thereby exerting self-dispersion properties in the aqueous medium. According to the present invention, by using self-dispersing gel-like resin dispersed particles and using a compound having both an epoxy group and a hydrolyzable silyl group as a curing agent, a uniformly crosslinked cured coating film is formed and the water resistance and light resistance are remarkably improved, and thus obtaining a normal temperature-curable coating composition which is very suited for practical use.

Specifically, the degree of gelation of the gel-like resin dispersed particles, which exist in the aqueous dispersion (I), is preferably within such a range that the aqueous dispersion (I) preferably has a light transmittance of 95% or less when it is made into a tetrahydrofuran solution having a solid content of 5% by weight (prepared by dissolving in tetrahydrofuran an aqueous dispersion having a solid content of 35% by weight).

The light transmittance when the aqueous dispersion (I) is made into a tetrahydrofuran solution having a solid content of 5% by weight (prepared by dissolving in tetrahydrofuran an aqueous dispersion having a solid content of 35% by weight) is the light transmittance obtained using a spectrophotometer to measure the light transmittance of a sample obtained by dissolving in tetrahydrofuran an aqueous dispersion (I) having a solid content of 35% by weight, to thereby reduce the solid content to 5% by weight. More specifically, it is the light transmittance obtained by measuring the light transmittance of the sample using a rectangular cell made of glass having an optical path length of 10 mm in the presence of a light source having a wavelength of 640 nm. Examples of the spectrophotometer include "Shimadzu Spectrophotometer UV-1200" manufactured by Shimadzu Corp.

The light transmittance (%) can be determined by the following equation. (Light transmittance (%))=(Measured value (%) of light transmittance of sample)/(Measured value (%) of light transmittance of tetrahydrofuran)×100

The aqueous dispersion (I) shows the light transmittance (%) of 95% or less. To remarkably reduce adhesion of the coating surface at high temperatures when forcibly drying, the light transmittance is preferably reduced to 80% or less Examples of the gel-like resin dispersed particles having a functional group selected from a salt of a tertiary amino group and a salt of an acid group include (1) crosslinked urethane urea resin particles formed from a self-dispersing resin, a polyisocyanate compound and a polyfunctional amine described in Japanese Patent Application, First Publication No. Hei 4-249517, (2) gel-like resin dispersed particles obtained by the crosslinking reaction of a vinyl polymer having a functional group selected from a salt of a tertiary amino group and a salt of an acid group, and a hydrolyzable group or hydroxyl group-containing polysiloxane segment, (3) gel-like resin dispersed particles obtained by crosslinking a vinyl polymer (A-1) having a functional group selected from a salt of a tertiary amino group and a salt of an acid group, and a hydrolyzable silyl group, and (4) gel-like resin dispersed particles obtained by crosslinking a vinyl polymer (A-2) having a functional group selected from a salt of a tertiary amino group and a salt of an acid group, or the functional group and a hydroxyl group or an epoxy group with a compound (B) having a molecular weight of 500 or less, the compound (B) having both a functional group, which has reactivity with a group selected from salt of tertiary amino group, salt of acid group, hydroxyl group and epoxy group, which exist in the vinyl polymer (A-2), and a hydrolyzable silyl group.

Among these gel-like resin dispersed particles, the gel-like resin dispersed particles (3) and (4) are particularly preferred because of the excellent weather resistance of the cured coating film.

The gel-like resin dispersed particles (3) can be prepared by dispersing the vinyl polymer (A-1) having a functional group selected from a salt of a tertiary amino group and a salt of an acid group, and a hydrolyzable silyl group, in an aqueous medium and performing the crosslinking reaction in the resulting dispersed particles.

The gel-like resin dispersed particles (4) can be prepared by dispersing a mixture of the vinyl polymer (A-2) and the compound (B) in an aqueous medium and performing the crosslinking reaction in the resulting dispersed particles, wherein the vinyl polymer (A-2) has a functional group selected from a salt of a tertiary amino group and a salt of an acid group, or a functional group and a hydroxyl group or an epoxy group, and the compound (B) has a molecular weight of 500 or less, and has both a functional group, which has reactivity with a group selected from a salt of a tertiary amino group, a salt of an acid group, hydroxyl group or epoxy group, which exist in the vinyl polymer (A-2), and a hydrolyzable silyl group (hereinafter abbreviated as "compound (B)").

As the vinyl polymer (A-1) or vinyl polymer (A-2), various vinyl polymers can be used and examples thereof include polymers made from monomers such as acrylic monomers, aromatic vinyl monomers, vinyl ester monomers, and fluoroolefin monomers.

Among these polymers, an acrylic polymer and a fluoroolefin polymer are preferred because the resulting cured coating film has good water resistance and weather resistance.

As the method of introducing the functional group selected from the salt of a tertiary amino group and the salt of an acid group, and the hydrolyzable silyl group into the vinyl polymer (A-1), for example, there can be preferably applied a method of copolymerizing a vinyl monomer having a tertiary amino group or an acid group, a hydrolyzable silyl group-containing vinyl monomer and, if necessary, the other vinyl monomer capable of copolymerizing with these monomers, and neutralizing a portion or all of the tertiary amino group or the acid group to form a salt.

The method of introducing the functional group selected from a salt of a tertiary amino group and a salt of an acid group into the vinyl polymer (A-2) includes, for example, a method of copolymerizing a vinyl monomer having a tertiary amino group or an acid group and, if necessary, the other vinyl monomer capable of copolymerizing with the monomer, and neutralizing a portion or all of the tertiary amino group or acid group to form a salt. In case of introducing a hydroxyl group or an epoxy group into the vinyl polymer (A-2), polymerization is preferably conducted by using a hydroxyl group-containing vinyl monomer or an epoxy group-containing vinyl monomer in combination.

Examples of the tertiary amino group-containing vinyl monomer (hereinafter abbreviated as "(a-1)") include various (meth)acrylic acid ester monomers such as 2-dimethylaminoethyl (meth)acrylate, 2-diethylaminoethyl (meth)acrylate, 3-dimethylaminopropyl (meth)acrylate, 3-diethylaminopropyl (meth)acrylate, N-[2-(meth) acryloyloxyethyl]piperidine, N-[2-(meth)acryloyloxyethyl] pyrrolidine and N-[2-(meth)acryloyloxyethyl]morpholine; aromatic monomers such as 4-(N,N-dimethylamino)styrene, 4-(N,N-diethylamino)styrene and 4-vinylpyridine; (meth) actylamide monomers such as N-[2-dimethylaminoethyl] (meth)acrylamide and N-[3-dimethylaminopropyl] (meth) acrylamide; and vinyl ether monomers such as 2-dimethylaminoethyl vinyl ether, 2-diethylaminoethyl vinyl ether, 3-dimethylaminopropyl vinyl ether, 3-diethylaminopropyl vinyl ether, 4-dimethylaminobutyl vinyl ether and 6-dimethylaminohexyl vinyl ether.

Among these monomers, (meth)acrylic acid ester monomers are particularly preferred because of excellent copolymerizability with other monomers.

Examples of the acid group-containing vinyl monomer (hereinafter abbreviated as "(a-2)") include (meth)acrylic acid, crotonic acid, maleic acid and itaconic acid; half esters such as half esters of maleic acid and an alkyl alcohol having 1 to 10 carbon atoms, half esters of itaconic acid and an alkyl alcohol having 1 to 10 carbon atoms, and half esters of fumaric acid and an alkyl alcohol having 1 to 10 carbon atoms; citraconic acid, 4-vinylbenzoic acid, cinnamic acid, mono 2-(meth)acryloyloxyethyl succinate and 2-(meth) acryloyloxyethyl phthalate; various monovinyl esters of various polyhydric carboxylic acids such as maronic acid, succinic acid, adipic acid and sebacic acid; phosphoric acid group-containing vinyl monmers such as mono{2-(meth) acryloyloxyethyl}acid phosphate; and various sulfonic acid group-containing monomers such as p-benzenesulfonic acid, 2-(meth)acryloyloxyethanesulfonic acid, 3-(meth) acryloyloxypropanesulfonic acid and 2-acrylamide-2-methylpropanesulfonic acid.

Among these monomers, monomers having a carboxyl group are preferably used because of excellent copolymerizability with other monomers, and (meth)acrylic acid is particularly preferred.

In the hydrolyzable silyl group-containing vinyl monomer (hereinafter abbreviated as "(a-3)"), the hydrolyzable silyl group refers to an atomic group having a silicon atom bonded with an alkoxy group, a substituted alkoxy group, a phenoxy group, a phenoxy group, a halogen atom, an isopropenyloxy group, an acyloxy group or an iminooxy group, and is easily hydrolyzed to form a silanol group. Specific examples thereof include alkoxysilyl group, phenoxysilyl group, halosilyl group, isopropenyloxysilyl group, acyloxysilyl group and iminooxysilyl group. Specific examples of the hydrolyzable silyl group-containing vinyl monomer (a-3) include γ(meth)

acryloyloxypropyltrimethoxysilane, γ(meth) acryloyloxypropylmethyldimethoxysilane, γ(meth) acryloyloxypropyltriethoxysilane, γ(meth) acryloyloxypropylmethyldiethoxysilane, γ(meth) acryloyloxypropyltriisopropenyloxysilane, γ(meth) acryloyloxypropyltriiminooxysilane, vinyltrimethoxysilane, vinyltriethoxysilane, vinyl(tris-βmethoxyethoxy)silane, vinyltriacetoxysilane and vinyltrichlorosilane.

Among these monomers, γ(meth) acryloyloxypropyltrimethoxysilane, γ(meth) acryloyloxypropylmethyldimethoxysilane, γ(meth) acryloyloxypropyltriethoxysilane, γ(meth) acryloyloxypropylmethyldiethoxysilane and γ(meth) acryloyloxypropyltriisopropenyloxysilane are particularly preferred because an internal crosslinking rate can be easily adjusted.

Specific examples of the other vinyl monomer capable of copolymerizing with (a-1) to (a-2) (hereinafter abbreviated as "(a-4)") include (meth)acrylic acid esters such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, 2-ethylhexyl (meth)acrylate, lauryl (meth)acrylate, cyclohexyl (meth)acrylate, benzyl (meth)acrylate, 2-hydroxyethyl (meth)acrylate, 2-hydroxypropyl (meth)acrylate, 2-hydroxybutyl (meth)acrylate and 4-hydroxybutyl (meth)acrylate; unsaturated dibasic acid dialkyl esters such as dimethyl maleate, dimethyl fumarate, dibutyl fumarate and dimethyl itaconate; carbonic acid amide group-containing vinyl monomers such as N,N-dimethyl(meth) acrylamide, N-alkoxymethyl(meth)acrylamide, diacetone (meth)acrylamide and N-methylol(meth)acrylamide; crotonic acid esters such as methyl crotonate, ethyl crotonate and n-butyl crotonate; vinyl esters such as vinyl acetate, vinyl benzoate and vinyl ester of branched monocarboxylic acid (e.g. "VEOVA", manufactured by Shell Netherlands); nitrile group-containing vinyl monomers such as acrylonitrile; and various (per)fluoroalkyl group-containing vinyl monomers such as fluoroalkyl (meth)acrylate, perfluoroalkyl (meth)acrylate, perfluorocyclohexyl (meth)acrylate, diperfluorocyclohexyl fumarate and N-isopropylperfluorooctanesulfonamideethyl (meth) acrylate; polysiloxane group-containing vinyl monomers represented by

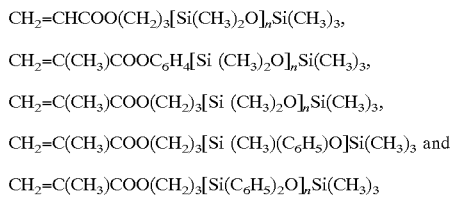

$CH_2=CHCOO(CH_2)_3[Si(CH_3)_2O]_nSi(CH_3)_3$, $CH_2=C(CH_3)COOC_6H_4[Si(CH_3)_2O]_nSi(CH_3)_3$, $CH_2=C(CH_3)COO(CH_2)_3[Si(CH_3)_2O]_nSi(CH_3)_3$, $CH_2=C(CH_3)COO(CH_2)_3[Si(CH_3)(C_6H_5)O]Si(CH_3)_3$ and $CH_2=C(CH_3)COO(CH_2)_3[Si(C_6H_5)_2O]_nSi(CH_3)_3$ (wherein n represents 0 or an integer of 1 to 130); olefin halides such as vinyl chloride, vinylidene chloride, vinyl fluoride, vinylidene fluoride, tetrafluoroethylene, hexafluoropropylene and chlorotrifluoroethylene; aromatic vinyl monomers such as styrene, α-methylstyrene, p-tert-butylstyrene and vinyltoluene; and vinyl ethers such as ethyl vinyl ether, n-propyl vinyl ether, iso-butyl vinyl ether, 2-ethylhexyl vinyl ether, cyclohexyl vinyl ether, cyclopentyl vinyl ether, 2-hydroxyethyl vinyl ether, 4-hydroxybutyl vinyl ether and 6-hydroxyhexyl vinyl ether.

It is also possible to use monomers having a polyether segment, such as polyethylene glycol (meth)acrylate, polypropylene glycol (meth)acrylate, polytetramethylene glycol (meth)acrylate, monoalkoxy ethylene glycol (meth) acrylate and monoalkoxy propylene glycol (meth)acrylate as far as the water resistance and weather resistance are not adversely affected.

Among these monomers, (meth)acrylic acid esters are particularly preferred because of excellent copolymerizability with other monomers.

The vinyl polymer (A-1) and vinyl polymer (A-2) may be prepared from the monomers described above in detail according to a conventionally known polymerization method. A solution radical polymerization method is particularly preferred because it is the most simple.

Typical examples of solvents to be used include various hydrocarbon solvents such as toluene, xylene, cyclohexane, n-hexane and octane; alcohol solvents such as methanol, ethanol, iso-propanol, n-butanol, iso-butanol, sec-butanol, ethylene glycol monomethyl ether, ethylene glycol monoethyl ether, ethylene glycol monoisopropyl ether and ethylene glycol monobutyl ether; ester solvents such as methyl acetate, ethyl acetate, n-butyl acetate and amyl acetate; and ketone solvents such as acetone, methyl ethyl ketone, methyl isobutyl ketone and cyclohexanone. These solvents may be used alone or in combination.

Using the solvents described above and various known conventional azo and peroxide radical polymerization initiators, the polymerization may be carried out by a conventional method. In that case, various chain transfer agents such as lauryl mercaptan, octyl mercaptan, dodecyl mercaptan, 2-mercaptoethanol, octyl thioglycolate, 3-mercaptopropionic acid and α-methylstyrene dimer can also be used as a molecular weight modifier.

The amount of the salt of the tertiary amino group to be introduced into the vinyl polymer (A-1) or vinyl polymer (A-2) thus prepared is not specifically limited as far as the resin component in the aqueous medium can exhibit self-dispersion properties, and is specifically within a range from 0.03 to 2.5 mol based on 1,000 g of the solid content in view of dispersion in the aqueous medium. The amount is properly within a range from 0.05 to 1.5 mol, and most preferably from 0.05 to 0.5 mol.

When the tertiary amino group is consumed by internal crosslinking in the vinyl polymer (A-2), the amount of the salt of the tertiary amino group, excluding the amount involved in the internal crosslinking, is preferably adjusted within a range from 0.03 to 2.5 mol, more preferably from 0.05 to 1.5 mol. and most preferably from 0.05 to 0.5 mol, based on 1,000 g of the solid content.

The amount of the salt of the acid group to be introduced into the vinyl polymer (A-1) or vinyl polymer (A-2) is not specifically limited, similar to the case of the salt of the tertiary amino group, as far as the resin component in the aqueous medium can exhibit self-dispersion properties, and is preferably within a range from 0.1 to 1.0 mol, and most preferably from 0.3 to 0.7 mol, based on 1,000 g of the solid content of the vinyl polymer (A-1) or vinyl polymer (A-2).

When the salt of the acid group is consumed by internal crosslinking, the amount of the salt of the acid group, excluding the amount involved in the internal crosslinking, is preferably within a range from 0.1 to 1.0 mol, and most preferably from 0.3 to 0.7 mol, based on 1,000 g of the solid content.

The amount of the hydrolyzable silyl group in the vinyl polymer (A-1) is not specifically limited and the proportion of the hydrolyzable silyl group-containing vinyl monomer (a-3) is preferably within a range from 0.3 to 15% by weight based on the total monomers constituting the vinyl polymer (A-1). When the proportion is 0.3% by weight or more, the drying properties are further improved. On the other hand, when the proportion is 15% by weight or less, the alkali resistance and water resistance of the cured coating film are more improved. In view of balance between these properties, the proportion is preferably within a range from 0.5 to 10% by weight.

Examples of the hydroxyl group-containing vinyl monomer used to introduce a hydroxyl group and an epoxy group, which exist in the vinyl polymer (A-2), include 2-hydroxyethyl (meth)acrylate, 2-hydroxypropyl (meth) acrylate, 2-hydroxybutyl (meth)acrylate and 4-hydroxybutyl (meth)acrylate, and examples of the epoxy group-containing vinyl monomer include glycidyl (meth)acrylate and (β-methyl)glycidyl (meth)acrylate.

The amount of the group contained in the vinyl polymer (A-2) which is involved in the reaction with the compound (B) is not specifically limited and the proportion of (a-1) or (a-2) involved in the reaction with the hydroxyl group-containing vinyl monomer, the epoxy group-containing vinyl monomer or the compound (B) is preferably within a range from 0.3 to 15% by weight based on the total monomers constituting the vinyl polymer (A-2). When the proportion is 0.3% by weight or more, the drying properties are further improved. On the other hand, when the proportion is 15% by weight or less, the alkali resistance and water resistance of the cured coating film are more improved. In view of the balance between these properties, the proportion is preferably within a range from 0.5 to 10% by weight.

Examples of the compound (B) include various epoxysilane compounds such as γ-glycidoxypropyltrimethoxysilane, γglycidoxypropyltriethoxysilane, γglycidoxypropylmethyldimethoxysilane, γglycidoxypropylmethyldiethoxysilane, β-(3,4epoxycyclohexyl)ethyltrimethoxysilane, β-(3,4epoxycyclohexyl)ethyltriethoxysilane, β-(3,4epoxycyclohexyl)ethylmethyldiethoxysilane, γglycidoxypropyltriisopropenyloxysilane and γglycidoxypropyltriiminooxysilane; various adducts of isocyanatesilane compounds and glycidol, such as γisocyanatepropyltriisopropenyloxysilane and γisocyanatepropyltrimethoxysilane; and aminosilane compounds such as γ-aminopropyltrimethoxysilane.

An appropriate compound (B) is selected according to the kind of crosslinkable functional group in the vinyl polymer (A-2). When the crosslinkable functional group in (A-2) is, for example, a hydroxyl group, an isocyanatesilane compound is appropriate. Similarly, when it is a tertiary amino group or a carboxyl group, an epoxysilane compound is appropriate. When it is an epoxy group, an aminosilane compound is appropriate.

The amount of the compound (B) with regard to the vinyl polymer (A-2) is preferably adjusted such that the equivalent ratio of tertiary amino groups, acid groups, hydroxyl groups or epoxy groups involved in the reaction with the compound (B) in the vinyl polymer (A-2) to functional groups having reactivity with groups selected from salts of tertiary amino groups, salt of acid groups, hydroxyls group and epoxy groups, which exist in the vinyl polymer (A-2), in the compound (B) is from 0.8 to 1.2.

When the ratio is smaller than 0.8, it becomes difficult to obtain the desired internal crosslink density. On the other hand, when the ratio is larger than 1.2, an increase in the amount of the compound (B), which is isolated without being reacted with the crosslinkable functional group in (A-2), makes it difficult to obtain fast curability for the coating film.

When the compound (B) is mixed with the vinyl polymer (A-2), the compound (B) is preferably mixed with (A-2) as uniformly as possible under conditions in which no gelation occurs during mixing.

The vinyl polymer (A-1) or vinyl polymer (A-2) can be made into an aqueous dispersion having self-dispersion properties by neutralizing a portion or all of the tertiary amino groups or acid groups, which exists in the polymer, after the polymerization of the monomer. For the vinyl polymer (A-2), the monomer component is mixed with the compound (B) and then a portion or all of the tertiary amino group or acid groups which exists in the mixture can be neutralized.

When the vinyl polymer (A-1) or vinyl polymer (A-2) has both a salt of a tertiary amino group or a salt of an acid group, the neutralization is conducted by adding either of an acidic compound or a basic compound. When the tertiary amino group is neutralized, a neutralized substance having water dispersion properties can be obtained by partially or completely neutralizing the tertiary amino group with the acidic compound. When the acid group is neutralized, a neutralized substance having water dispersion properties can be obtained by partially or completely neutralizing the acid group with the basic compound.

The acidic compound is not specifically limited and examples thereof include carboxylic acids having 1 to 10 carbon atoms, such as formic acid, acetic acid, propionic acid, butyric acid, 2-methylbutyric acid, isovaleric acid, trimethylacetic acid, glycolic acid and lactic acid; various mono- or dialkyl esters of phosphoric acid, such as phosphoric acid monomethyl ester, phosphoric acid dimethyl ester, phosphoric acid mono-iso-propyl ester, phosphoric acid di-iso-propyl ester, phosphoric acid mono-2-ethylhexyl ester and phosphoric acid di-2-ethylhexyl ester; organic sulfonic acids such as methanesulfonic acid, propanesulfonic acid, benzenesulfonic acid and dodecylbenzenesulfonic acid; and various inorganic acids such as hydrochloric acid, sulfuric acid, nitric acid and phosphoric acid. Among these acid compounds, carboxylic acids are preferably used because these compounds are sufficiently volatilized during drying and the amount remained in the coating film after drying is small and, therefore, the resulting cured coating film has good water resistance.

Typical examples of the basic compound include organic amine compounds such as methylamine, dimethylamine, trimethylamine, ethylamine, diethylamine, triethylamine, n-butylamine, tri-n-butylamine, 2-amino-2-methylpropanol, 2-amino-ethanol and 2-dimethylaminoethanol; inorganic basic substances such as ammonia, sodium hydroxide and potassium hydroxide; quaternary ammonium hydroxides such as tetramethylammonium hydroxide, tetrabutylammonium hydroxide and trimethylbenzylammonium hydroxide.

Among these basic compounds, ammonia and various amines are used, particularly preferably, because these compounds are sufficiently volatilized during drying and the amount remained in the coating film after drying is small and, therefore, the resulting cured coating film has good water resistance.

The amount of the acidic compound to be added when neutralizing a tertiary amino group is an amount sufficient to enable the vinyl polymer (A-1) or vinyl polymer (A-2) to exert self-water dispersion properties when the vinyl polymer (A-1) or vinyl polymer (A-2) has only a salt of a tertiary amino group or has both a salt of a tertiary amino group and a salt of an acid group among a salt of a tertiary group and a salt of an acid group. For the vinyl polymer (A-1), the equivalent ratio of the acidic compound to that of the tertiary amino groups immediately after the polymerization of the vinyl polymer is preferably within a range from 0.1 to 2, and particularly preferably from 0.5 to 1.5.

For the vinyl polymer (A-2), the equivalent ratio of the acidic compound to that of the tertiary amino groups excluding those involved in the reaction with the compound (B) is preferably within a range from 0.1 to 2, and particularly preferably from 0.5 to 1.5.

The amount of the basic compound to be added when neutralizing acid groups is an amount enough to enable the vinyl polymer (A-1) or vinyl polymer (A-2) to exert self-water dispersion properties when the vinyl polymer (A-1) or vinyl polymer (A-2) has only a salt of an acid group or has both a salt of a tertiary amino group and a salt of an acid group. For the vinyl polymer (A-1), the equivalent ratio the basic compound to that of the acid groups immediately after the polymerization of the vinyl polymer is preferably within a range from 0.1 to 2, and particularly preferably from 0.5 to 1.5.

For the vinyl polymer (A-2), the equivalent ratio of the basic compound to that of the acid groups excluding those involved in the reaction with the compound (B) is preferably within a range from 0.1 to 2, and particularly preferably from 0.5 to 1.5.

In the present invention, as described above, either of a salt of a tertiary amino group or a salt of an acid group exists in the vinyl polymer (A-1) or vinyl polymer (A-2). By using both in combination, the reactivity with the compound (II) having both an epoxy group and a hydrolyzable silyl group, which is described hereinafter, is remarkably enhanced and drying properties for normal temperature-curable aqueous coating compositions are remarkably enhanced.

Since a so-called acrylic emulsion composition obtained by the emulsion polymerization using an emulsifier or a surfactant has a high molecular weight and good drying properties, it shows satisfactory fast drying properties.

In a so-called dispersion type coating composition wherein resin particles are self-dispersed, since the resin particles are dispersed in an aqueous medium after the synthesis of the resin, the resin constituting the dispersed particles has a comparatively low molecular weight and is inferior in curability. In the present invention, since the vinyl polymer (A-1) or vinyl polymer (A-2) has both a salt of a tertiary amino group and a salt of an acid group, not only the reactivity with the compound (II) as a curing agent is remarkably enhanced, but also the curability in a two-pack curing system is remarkably improved because the dispersed particles are in the form of gel.

The vinyl polymer (A-1) or the mixture of the vinyl polymer (A-2) and the compound (B) thus obtained is dispersed in the aqueous medium and then internally crosslinked in the dispersed particles.

As the water dispersion method, various conventionally known methods can be applied. For example, the neutralized substance is dispersed in water by merely adding water to the neutralized substance, continuously or intermittently, or adding the neutralized substance to water, continuously or intermittently, thus making it possible to obtain an aqueous dispersion.

The vinyl polymer (A-1) or vinyl polymer (A-2) and water may be mechanically dispersed in the state of being from any previous mixing or the state of being previously mixed, using a dispersion apparatus having a high shear force. Alternatively, the vinyl polymer (A-1) before neutralization or a mixture of the vinyl polymer (A-2) before neutralization and the compound (B) may be mechanically dispersed in the state being from any previous mixing or the state of being previously mixed, using a dispersion apparatus having a high shear force.

Subsequently, the resulting aqueous dispersion is internally crosslinked in the dispersed particles. Although the crosslinking reaction partially occurs sometimes in the preparation of the vinyl polymer (A-1) or vinyl polymer (A-2), it does not adversely affect the following water dispersion process as far as the fluidity is not completely lost by so-called gelation.

The crosslinking reaction in the dispersed particles can be carried out by the formation of a disiloxane bond due to the condensation reaction between hydrolyzable silyl groups which exist in the dispersed particles. When using the vinyl polymer (A-1), the siloxane crosslinking can be carried out by the condensation reaction between hydrolyzable silyl groups contained in the vinyl polymer (A-1). On the other hand, when using the vinyl polymer (A-2), a disiloxane bond can be formed by the condensation reaction between hydrolyzable silyl groups in the compound (B) and the internal crosslinking is formed by the reaction between the vinyl polymer (A-2) and the compound (B).

As the conditions of the crosslinking reaction, the crosslinking reaction is preferably promoted when the vinyl polymer (A-1) is dispersed in the aqueous medium, or after the vinyl polymer (A-2) and the compound (B) are dispersed in the aqueous dispersion and then uniformly dispersed. The degree to which the crosslinking reaction proceeds can be adjusted by controlling the temperature conditions after the dispersion and the time for which the temperature is maintained. Specifically, the crosslinking reaction is preferably carried out at a temperature within a range from 20 to 100° C. and, furthermore, the reaction product may be maintained at the temperature with a range from 40 to 100° C. until the light transmittance of the dispersed particles becomes 95% or less.

If necessary, the organic solvent used in the preparation of the vinyl polymer (A-1) or vinyl polymer (A-2) is preferably removed, partially or completely, by heating or under reduced pressure after the water dispersion. Such a removal process can be carried out after the completion of the crosslinking reaction, or simultaneously with the crosslinking reaction.

It can be confirmed by measuring the light transmittance when the dispersion is made into a tetrahydrofuran solution having a solid content of 5% by weight (prepared by dissolving in tetrahydrofuran an aqueous dispersion having a solid content of 35% by weight) whether the internal crosslinking occurs or not.

Accordingly, in the present invention, it is preferred that the dispersion into the aqueous medium is carried out under the condition where the light transmittance becomes 95% or more when the dispersion is made into a tetrahydrofuran solution having a solid content of 5% by weight, and then the crosslinking reaction is carried out, thereby controlling the light transmittance to 95% or less.

The two-pack aqueous curable resin composition of the present invention can be prepared by using the aqueous dispersion (I) thus obtained of the present invention in combination with the compound (II) having both an epoxy group and a hydrolyzable silyl group.

A two-pack curable composition having not only water resistance and weather resistance of the coating film, but also excellent stain resistance, solvent resistance and chemical resistance can be obtained by using the aqueous dispersion of the present invention as a main agent and using a compound having both an epoxy group and a hydrolyzable silyl group as a curing agent.

In a two-pack curing system consisting of an aqueous dispersion (main agent) and a curing agent like the present invention, the affinity or miscibility between the main agent and curing agent are important to obtain a uniform crosslinking degree, and contributes to formation of a cured coating film exhibiting excellent properties. An aqueous two-pack curing system has a problem that, since the resin as the main agent is not in the form of dispersed particles, the curing agent does not interfuse into the particles and, therefore, a cured coating film having a uniform crosslinking degree cannot be obtained and satisfactory physical properties for the coating film cannot be obtained. In the crosslinking system of the present invention, since the dispersed particles themselves are internally crosslinked even if the curing agent does not interfuse into water dispersed particles of the resin as the main agent, a cured coating film having an entirely uniform degree of crosslinking can be obtained, and thus the water resistance and weather resistance of the coating film are remarkably improved. In addition, the coating film is also superior in stain resistance, solvent resistance and chemical resistance.

Examples of the compound (II) having both an epoxy group and a hydrolyzable silyl group include vinyl polymer having both an epoxy group and a hydrolyzable silyl group, and epoxy group-containing silane coupling agent.

As the vinyl polymer having both an epoxy group and a hydrolyzable silyl group, for example, the following vinyl polymers can be preferably used.

Examples thereof include copolymer of hydrolyzable silyl group-containing vinyl monomer and epoxy group-containing vinyl monomer, and copolymer of hydrolyzable silyl group-containing vinyl monomer, epoxy group-containing vinyl monomer and other vinyl monomers.

Examples of usable hydrolyzable silyl group-containing vinyl monomer include γ(meth)acryloyloxypropyltrimethoxysilane, γ(meth)acryloyloxypropylmethyldimethoxysilane, γ(meth)acryloyloxypropyltriisopropenyloxysilane, γ(meth)acryloyloxypropyltriiminooxysilane, vinyltrimethoxysilane, vinyltriethoxysilane, vinyl(tris-βmethoxyethoxy)silane, vinyltriacetoxysilane and vinyltrichlorosilane.

Examples of the epoxy group-containing vinyl monomer include glycidyl (meth)acrylate, (β-methyl)glycidyl (meth)acrylate, 3,4-epoxycyclohexyl (meth)acrylate, allylglycidyl (meth)acrylate, 3,4-epoxyvinylcyclohexane, di(βmethyl)glycidyl maleate and di(β-methyl)glycidyl fumarate.

Examples of the other copolymerizable vinyl monomer include vinyl monomer (a-4) described above.

As the polymerization method for preparation of these copolymers, a conventionally known means can be used and examples thereof include a method of solution radical copolymerization of the monomers described above or a method of solution radical copolymerization of the monomer mixtures described above in the presence of various chain transfer agents having a hydrolyzable silyl group, for example, γmercaptopropyltrimethoxysilane, γmercaptopropyltriethoxysilane, γmercaptopropylmethyldimethoxysilane, γmercaptopropyltriisopropenyloxysilane and γmercaptopropyltriiminooxysilane.

The vinyl polymer having both an epoxy group and a hydrolyzable silyl group is preferably mixed with the aqueous resin dispersion (I) as the main agent after dissolving in a proper organic solvent, when using as the curing agent.

Examples of the epoxy group-containing silane coupling agent include γ-glycidoxypropyltrimethoxysilane, γglycidoxypropyltriethoxysilane, γglycidoxypropylmethyldimethoxysilane, γglycidoxypropylmethyldiethoxysilane, β-(3,4epoxycyclohexyl)ethyltrimethoxysilane, β-(3,4epoxycyclohexyl)ethyltriethoxysilane, β-(3,4epoxycyclohexyl)ethylmethyldiethoxysilane, γglycidoxypropyltriisopropenyloxysilane or γglycidoxypropyltriiminooxysilane; adduct of an isocyanatesilane compound such as γisocyanatepropyltriisopropenyloxysilane or γisocyanatepropyltrimethoxysilane and glycidol; adduct of an aminosilane compound such as γ-aminopropyltrimethoxysilane and a diepoxy compound; and compound having two or more epoxy groups and a hydrolyzable silyl group in a molecule.

Among these epoxy group-containing silane coupling agents, an epoxy group-containing silane coupling agent is particularly preferred because the uniformity of the crosslinking degree of the coating film is improved.

In the aqueous curable resin composition of the present invention, a mixing ratio of the aqueous dispersion (I) to the compound (II) is controlled such that a molar ratio represented by the number of moles of the epoxy group contained in the compound (II) to the total number of moles of the residual tertiary amino group and the residual acid group in the aqueous dispersion (I) (hereinafter referred to as "the ratio of the number of moles of the epoxy group in the compound (II) to the total number of moles of the residual tertiary amino group and the residual acid group in the aqueous dispersion (I)") is within a range from 0.1 to 3.0, preferably from 0.3 to 2.0, and particularly preferably from 0.5 to 1.5.

In the aqueous curable resin composition of the present invention, by using a compound which has a hydrolyzable silyl group or a silanol group and does not have an epoxy group (hereinafter abbreviated as "compound (III)") in combination with the aqueous dispersion (I) and the compound (II), the weather resistance of the cured coating film can be further improved and the hardness can be further enhanced.

Specific examples of the compound (III), which has a hydrolyzable silyl group or a silanol group and does not have an epoxy group, include silicate compounds such as methyl silicate, ethyl silicate, isopropyl silicate and n-butyl silicate; trifunctional silane compounds such as methyltrimethoxysilane, phenyltrimethoxysilane, methyltriethoxysilane, phenyltriethoxysilane and isobutyltrimethoxysilane; difunctional silane compounds such as dimethyldimethoxysilane, dimethyldiethoxysilane, diethyldimethoxysilane, diethyldiethoxysilane and diphenyldimethoxysilane; halosilanes such as methyltrichlorosilane, phenyltrichlorosilane, ethyltrichlorosilane, dimethyldichlorosilane and diphenyldichlorosilane; lower-molecular silanol compounds obtained by hydrolyzing various difunctional or trifunctional silane compounds described above; linear or cyclic polysiloxanes having a silanol group obtained by hydration condensation of the silanol compounds; and linear or cyclic polysiloxane compounds obtained by partial hydrolysis condensation of at least one compound selected from difunctional silane compounds, trifunctional silane compounds and silicate compounds described above.

The amount of the compound (III) is preferably within a range from 0.5 to 200 parts by weight, and particularly preferably from 1 to 100 parts by weight, based on 100 parts by weight of the resin solid content of the aqueous dispersion (I) in view of the effect of improving the weather resistance and hardness of the cured coating film.

If necessary, a curing catalyst (IV) can be added to the aqueous curable resin composition of the present invention. The curability can be further improved by adding the curing catalyst (IV).

Specific examples of the curing catalyst (IV) include basic compounds such as lithium hydroxide, sodium hydroxide, potassium hydroxide and sodium methylate; metal containing compounds such as tetraisopropyl titanate, tetra-n-butyl titanate, tin octylate, lead octylate, cobalt octylate, zinc octylate, calcium octylate, zinc naphthenate, cobalt naphthenate, di-n-butyltin diacetate, di-n-octyltin dioctoate, di-n-butyltin dilaurate and di-n-butyltin maleate; dispersions of various metal containing compounds in water, obtained by using an emulsifier or a surfactant; and acid compounds such as p-toluenesulfonic acid, trichloroacetic acid, phosphoric acid, monoalkylphosphoric acid, dialkylphosphoric acid, monoalkylphosphorous acid and dialkylphosphorous acid.

It is also possible to add various additives, for example, film forming auxiliaries, such as isopropyl alcohol, sec-butanol, n-butanol, 2-ethylhexanol, 2-propoxyethanol, 2-n-butoxyethanol, 2-n-propoxypropanol, 3-n-propoxypropanol, 2-n-butoxypropanol, 3-n-butoxypropanol, 2-n-butoxyethyl acetate, diethylene glycol monobutyl ether, N-methylpyrrolidone, 2,2,4-trimethyl-1,3-pentanediol monobutyrate, dibutyl phthalate, and butylbenzyl phthalate, defoamers, organic pigments, inorganic pigments, plasticizers, antioxidants, ultraviolet absorbers, photostabilizers, leveling agents, repelling inhibitors, skinning inhibitors, dispersants and thickeners to the aqueous curable resin composition of the present invention, if necessary.

Immediately before using the aqueous curable resin composition thus obtained of the present invention, the aqueous medium (I) is mixed with the compound (II) having both an epoxy group and a hydrolyzable silyl group. It is preferred that the resulting aqueous curable resin composition is applied within one day (24 hours), and preferably 12 hours, after the completion of mixing.

The two-pack aqueous curable resin composition of the present invention can be applied on various substrates by a conventional method and can be widely used because of its fast curability as compared with a conventional dispersion type coating composition. Specifically, a cured coating film can be formed by drying at normal temperature for about 1 to 10 days, forcibly drying at a temperature ranging from 40 to 100° C. for about 1 to 60 minutes, or baking and drying at a temperature ranging from 100 to 180° C. for about 1 to 60 minutes. When the coating film is dried and cured under these conditions, the organic solvent is less likely to be charged into the atmosphere and a cured article having excellent weather resistance, solvent resistance and chemical resistance can be obtained. At the same time, it is made possible to achieve important properties during the coating operation such as fast drying properties and fast curability, and the resulting product is widely usable.

The curable resin composition for aqueous coating composition of the present invention can be widely used as coating compositions for construction, roofing tiles, magnetic tiles, glass, woodwork and various plastic products, and coating compositions for various metal materials such as aluminum, stainless steel, chrome plating, galvanized iron sheet and tinned-sheet iron.

According to the present invention, an aqueous normal temperature-curable resin composition having remarkably improved drying properties and curability, an aqueous dispersion which serves as a main agent of the composition, and a method of preparing the aqueous dispersion can be provided without impairing the performance of the coating film, such as its water resistance and weather resistance.

When using the aqueous curable resin composition of the present invention as the aqueous coating composition, it is possible to obtain a coating film which is less likely to discharge organic solvent into the atmosphere and which also has excellent solvent resistance and chemical resistance, in addition to obtaining properties in the coating film such as fast curability as well as water resistance and weather resistance.

Therefore, the coating workability is remarkably improved and also wide use for various purposes is possible.

EXAMPLES

The following Examples and Comparative Examples further illustrate the present invention in detail. In the following Examples and Comparative Examples, parts and percentages are by weight unless otherwise indicated.

Reference Examples 1 to 5

In a reaction vessel equipped with a stirrer, a thermometer, a condenser and a nitrogen gas introducing inlet, 200 parts of ethylene glycol monoisopropyl ether and 133 parts of 3-methoxybutanol were charged and heated to 80° C. in a nitrogen atmosphere.

Then, a mixture of a vinyl monomer and a radical polymerization initiator shown in Table 1 was added dropwise, continuously, for six hours. After completion of the dropwise addition, the mixture was maintained at 80° C. for six hours.

To the resin solution thus prepared, an acidic compound or a basic compound, as a neutralizer, shown in Table 1 was added, followed by mixing with stirring for 30 minutes. Subsequently, deionized water was intermittently added in the amount shown in Table 1 for one hour. After the completion of the dropwise addition, the temperature was maintained at 60° C. for three hours to obtain aqueous dispersions III-1 to 3 and aqueous dispersions 1 to 2, each having a nonvolatile content and a number-average molecular weight shown in Table 1.

TABLE 1

| Reference Examples | Reference Example 1 | Reference Example 2 | Reference Example 3 | Reference Example 4 | Reference Example 5 |
|---|---|---|---|---|---|
| Aqueous dispersion | Aqueous dispersion III-1 | Aqueous dispersion III-2 | Aqueous dispersion III-3 | Aqueous dispersion 1 | Aqueous dispersion 2 |
| Styrene | 50 | 50 | 50 | 50 | 50 |
| Methyl methacrylate | 125 | 75 | 75 | 75 | 75 |
| n-butyl methacrylate | 240 | 129 | 119 | 139 | 134 |
| 2-ethylhexyl methacrylate | | 160 | 160 | 160 | 175 |
| Ethyl acrylate | 35 | | | | |
| 2-hydroxyethyl methacrylate | | 50 | 50 | 50 | 50 |
| Dimethylamino methacrylate | 42 | 10 | | 10 | |
| Acrylic acid | | 10 | 10 | 10 | 10 |

TABLE 1-continued

| Reference Examples | Reference Example 1 | Reference Example 2 | Reference Example 3 | Reference Example 4 | Reference Example 5 |
|---|---|---|---|---|---|
| Methacrylic acid | | 6 | 6 | 6 | 6 |
| γ-methacryloyloxypropyltriethoxysilane | 8 | 10 | 30 | | |
| 2,2'-azobis(2-methylbutyronitrile) | 7.5 | 7.5 | 7.5 | 7.5 | 7.5 |
| Aqueous 88% formic acid | 14 | | | | |
| 2-amino-2-methyl-1-propanol | | 13 | 13 | 13 | 18 |
| Aqueous 25% ammonia solution | | 4 | 4 | 4 | |
| Deionized water | 730 | 590 | 550 | 550 | 552 |
| Nonvolatile content (%) | 31.6 | 34.8 | 36.0 | 36.4 | 36.7 |
| Number-average molecular weight | (*) | (*) | (*) | 25,000 | 23,000 |
| Light transmittance (%) | 68 | 64 | 78 | 100 | 100 |

Note:
*: impossible to measure a molecular weight by gel permeation chromatography (GPC)
Light transmittance: measured under the measuring conditions in the specification, using a tetrahydrofuran solvent Reference Example 6

To 840 parts of the resin solution before adding the neutralizer in Reference Example 4, 70 parts of γ-isocyanate propyltriethoxysilane was added, followed by mixing with stirring at 30° C. for 30 minutes. While maintaining the temperature at 30° C., 18 parts of 2-amino-2-methyl-1-propanol was added, followed by mixing with stirring for 30 minutes. Subsequently, 715 parts of deionized water was intermittently added for one hour while maintaining the temperature at 30° C. After the completion of the dropwise addition, the mixture was heated to 60° C. and then maintained at the same temperature for three hours to obtain an aqueous dispersion IV-1 having a nonvolatile content of 35.8%, an immeasurable molecular weight and a light transmittance of 62%.

Reference Example 7

To 840 parts of the resin solution before adding the neutralizer in Reference Example 4, 68 parts of γiglycidoxypropyltriethoxysilane was added, followed by mixing with stirring at 60° C. for 30 minutes. While maintaining the temperature at 60° C., 18 parts of 2-amino-2-methyl-1-propanol was added, followed by mixing with stirring for 30 minutes. Subsequently, 760 parts of deionized water was intermittently added for one hour. After the completion of the dropwise addition, the temperature was maintained at 60° C. for three hours to obtain an aqueous dispersion IV-2 having a nonvolatile content of 34.7%, an immeasurable molecular weight and a light transmittance of 72%.

Examples 1 to 8 and Comparative Examples 1 and 2

According to the formulations shown in Table 2-1 and Table 2—2, various white coating compositions as resin compositions for aqueous coating composition were prepared.

Then, a chromated aluminum sheet, a glass sheet and a polypropylene sheet were coated with each coating composition using an applicator having a diameter of 6 mil, and then dried at normal temperature for seven days to obtain various cured coating films. The evaluation results are shown in Table 3-1 and Table 3-2.

TABLE 2-1

| Examples | Example 1 | Example 2 | Example 3 | Comp. Example 1 | Comp. Example 2 |
|---|---|---|---|---|---|
| Aqueous dispersion III-1 | 100 | | | | |
| Aqueous dispersion III-2 | | 100 | | | |
| Aqueous dispersion III-3 | | | 100 | | |
| Aqueous dispersion 1 | | | | 100 | |
| Aqueous dispersion 2 | | | | | 100 |
| (R-930) | 17.1 | 18.7 | 19.4 | 19.6 | 19.8 |
| γ-GPTMS | | 4.5 | 3.5 | 4.6 | 3.6 |
| γ-GPTES | 4.7 | | | | |
| Name of coating composition | i-1 | i-2 | i-3 | ii-1 | ii-2 |

TABLE 2-2

| Examples | Example 4 | Example 5 | Example 6 | Example 7 | Example 8 |
|---|---|---|---|---|---|
| Aqueous dispersion III-1 | 100 | | | | |
| Aqueous dispersion III-2 | | 100 | | | |
| Aqueous dispersion III-3 | | | 100 | 100 | 100 |
| (R-930) | 19.3 | 18.7 | 18.7 | 18.7 | 18.7 |
| γ-GPTMS | 4.6 | 3.4 | 4.5 | 4.5 | 4.5 |
| DBTDL | | | 0.03 | | |
| (TSL) | | | | 20.0 | |
| (SH-6018) | | | | | 2.0 |
| Name of coating composition | i-4 | i-5 | i-6 | i-7 | i-8 |

"R-930": abbreviation of "TIPAQUE r-930" (trade name of titanium oxide manufactured by ISHIHARA SANGYO KAISHA, LTD.) γ-GPTMS: γ-glycidoxypropyltrimethoxysilane γ-GPTES: γ-glycidoxypropyltriethoxysilane DBTDL: abbreviation of dibutyltin dilaurate "TSL": blend of phenyltriethoxysilane ("TSL8178", manufactured by GE Toshiba Silicone Co., Ltd.) and 10=dimethyldiethoxysilane ("TSL8122", manufactured by GE Toshiba Silicone Co., Ltd.) in a molar ratio of 2/1 "SH-6018": silanol group-containing silicone compound (trade name, manufactured by Toray Silicone Co., Ltd.)

TABLE 3-1

| Examples | Example 1 | Example 2 | Example 3 | Comp. Example 1 | Comp. Example 2 |
|---|---|---|---|---|---|
| Name of coating composition | i-1 | i-2 | i-3 | ii-1 | ii-2 |
| Gel fraction (%) | 93 | 92 | 92 | 82 | 81 |
| Drying properties (touch with finger) | 25 | 25 | 27 | 55 | 58 |
| Initial gloss | 84 | 88 | 89 | 86 | 85 |
| Gloss retention (%) | 82 | 85 | 82 | 72 | 70 |
| Stain resistance ΔL | −2.8 | −2.4 | −2.6 | −8.2 | −9.0 |
| Solvent resistance | ○ | ○ | ○ | Δ | Δ |
| Alkali resistance | ○ | ○ | ○ | ○ | Δ |
| Water resistance | ○ | ○ | ○ | Δ | Δ |

TABLE 3-2

| Examples | Example 4 | Example 5 | Example 6 | Example 7 | Example 8 |
|---|---|---|---|---|---|
| Name of coating composition | i-4 | i-5 | i-6 | i-7 | i-8 |
| Gel fraction (%) | 93 | 92 | 94 | 97 | 97 |
| Drying properties (touch with finger) | 25 | 30 | 25 | 25 | 25 |
| Initial gloss | 86 | 86 | 85 | 82 | 81 |
| Gloss retention (%) | 83 | 83 | 81 | 87 | 88 |
| Stain resistance ΔL | −3.0 | −2.2 | −2.0 | −1.7 | −1.7 |
| Solvent resistance | ○ | ○ | ○ | ○ | ○ |
| Alkali resistance | ○ | ○ | ○ | ○ | ○ |
| Water resistance | ○ | ○ | ○ | ○ | ○ |

<<Notes for Table 3-1 and Table 3-2>>

Gel fraction (%): After drying at normal temperature for 24 hours, a coating film separated from a polypropylene substrate was dipped in acetone for 24 hours and a dry weight was divided by the weight of the coating film before dipping, followed by multiplication by 100 to give a numerical value, which was taken as a gel fraction (%).

Drying properties (touch with finger): The time required to lose adhesion of the coating film with finger was determined.

Gloss retention (%)=(G1/G0)×100 (where G1 denotes a 600 gloss value (600 mirror reflectivity %) after exposure for two years, while G0 denotes an initial 60° gloss value (60° mirror reflectivity %)

Stain resistance ΔL: After the coating film was allowed to stand outside in Takaishi-Shi, Osaka, Japan for one year, the surface of the coating film was washed with water and then the color hue of the surface of the coating film was measured by a color difference meter. A color difference ΔL was determined from the resulting lightness L value and its initial value.

Solvent resistance: A film was rubbed 100 times (back and forth) with a felt impregnated with methyl ethyl ketone under a load of 500 g. Then, the appearance of the coating film was visually evaluated according to the following criteria.

Criteria for evaluation are as follows.
○: no change
Δ: slight scratching
×: severe loss of gloss Alkali resistance: An aqueous 5% sodium hydroxide solution was dropped on the film and, after the passage of 24 hours, the sodium hydroxide was washed off. Then, the appearance of the coating film was visually evaluated according to the following criteria.

Criteria for evaluation are as follows.
○: no change
Δ: loss of gloss or discoloration
×: peeled off from the material Water resistance: After dipping the film in warm water at 40° C. for one week, the appearance of the coating film was visually evaluated according to the following criteria.

Criteria for evaluation are as follows.
○: no change
Δ: loss of gloss or swelling
×: peeled off from the material

What is claimed is:

1. A two-pack aqueous curable resin composition comprising a combination of (I) an aqueous resin dispersion containing, as essential components, gel resin dispersed particles having a functional group selected from the group consisting of a salt of a tertiary amino group and a salt of an acid group, and an aqueous medium; and (II) a compound having both an epoxy group and a hydrolyzable silyl group,
wherein the gel dispersed particles are obtained by crosslinking a vinyl polymer (A-2) having a functional group selected from the group consisting of a salt of a tertiary amino group, and a salt of an acid group, a salt of a tertiary amino group having a hydroxyl group or an epoxy group and an acid group having a hydroxyl group or an epoxy group, with a compound (B) having a molecular weight of 500 or less, which has both a functional group having reactivity with a group selected from the group consisting of a salt of a tertiary amino group, a salt of an acid group, a hydroxyl group and an epoxy group, which exist in the vinyl polymer (A-2), and a hydrolyzable silyl group. amino group and a salt of an acid group, and an aqueous medium; and (II) a compound having both an epoxy group and a hydrolyzable silyl group.

2. The composition according to claim 1, wherein the aqueous resin dispersion (I) has a light transmittance of 95% or less when it is made into a tetrahydrofuran solution having a solid content of 5% by weight (prepared by dissolving in tetrahydrofuran an aqueous dispersion having a solid content of 35% by weight).

3. The composition according to claim 1, wherein the gel resin dispersed particles contain both a salt of a tertiary amino group and a salt of an acid group.

4. The composition according to claim 1, wherein the gel resin dispersed particles are obtained by crosslinking a vinyl polymer (A-1) having a functional group selected from the group consisting of a tertiary amino group and a salt of an acid group, and a hydrolyzable silyl group.

5. The composition according to claim 4, wherein the content of the salt of the tertiary amino group in the vinyl polymer (A-1) is within a range from 0.03 to 2.5 mol based on 1,000 g of the solid content of the vinyl polymer (A-1).

6. The composition according to claim 4, wherein the content of the salt of the acid group in the vinyl polymer (A-1) is within a range from 0.1 to 1 mol based on 1,000 g of the solid content of the vinyl polymer (A-1).

7. The composition according to claim 1, wherein the content of the salt of the tertiary amino group in the vinyl polymer (A-2) is within a range from 0.03 to 2.5 mol based on 1,000 g of the solid content of the vinyl polymer (A-2).

8. The composition according to claim 1, wherein the content of the salt of the acid group in the vinyl polymer (A-1) is within a range from 0.1 to 1 mol based on 1,000 g of the solid content of the vinyl polymer (A-1).

9. The composition according to claim 1, wherein the amount of the compound (B) is adjusted such that the equivalent ratio of a group selected from a group consisting of a salt of a tertiary amino group, a salt of an acid group, a hydroxyl group and an epoxy group in the vinyl polymer (A-2) to functional groups having reactivity with a group selected from a group consisting of a salt of a tertiary amino group, a salt of an acid group, a hydroxyl group and an epoxy group, which exist in the vinyl polymer (A-2), is from 0.8 to 1.2.

10. The composition according to claim 1, wherein the compound (II) having both an epoxy group and a hydrolyzable silyl group is an epoxy group-containing silane coupling agent.

11. The composition according to claim 1, further comprising a compound (III) which has a hydrolyzable silyl group or a silanol group and does not have an expoxy group.

12. The composition according to claim 11, further comprising a curing catalyst (IV).

* * * * *